United States Patent Office 2,897,099
Patented July 28, 1959

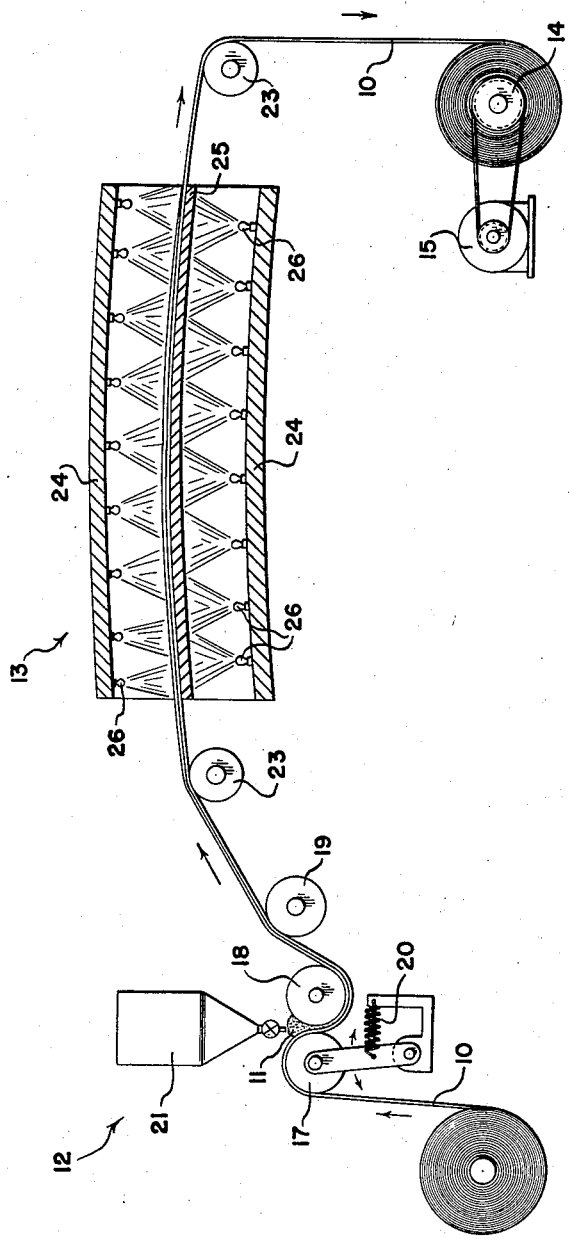

2,897,099

METHYL CELLULOSE COATED POLYESTER TAPE

Carl de Ganahl, Greenlawn, N.Y.

Application August 31, 1955, Serial No. 531,793

2 Claims. (Cl. 117—138.8)

This invention relates to a tape of polyester terephthalate film having a coating of methyl cellulose on one surface of the tape, and to the method of applying this coating to the tape.

In the manufacture of plastic objects, as for example in the manufacture of plastic pipe, a layer of reinforcing material coated and impregnated with a thermosetting liquid plastic composition is commonly applied about a form or mandrel upon which mandrel the plastic composition is subsequently cured to produce the desired reinforced plastic object. When the thermosetting material has been cured, it is difficult to remove the finished article from the mandrel due to adhesion between the cured plastic and the surface of the mandrel. Accordingly, to facilitate removal of the cured plastic article therefrom, a parting layer of an inert material is sometimes applied to the surface of the mandrel prior to application of the thermosetting material thereto. With the use of such parting layers the plastic object can be readily removed from the form or mandrel. Because of the exceptional strength of this material, it has been proposed that a layer of polyester terephthalate film (available under the trade name "Mylar") be employed as the parting material. However, great difficulty has been experienced in removing the film of terephthalate parting material from the inner surface of the plastic object, particularly when the object is molded of such thermosetting materials as alkyd polyester or epoxy resins.

I have found that the parting layer of polyester terephthalate film can be readily removed or stripped from the surface of the cured plastic article if the film is first coated with an adherent layer of dry methyl cellulose applied to the surface thereof that is contacted by the cured plastic. Although the methyl cellulose coated polyester terephthalate film is imminently suited for use as a parting material in the manufacture of plastic articles, I have experienced great difficult in preparing the film for this use. Methyl cellulose is advantageously applied to the surface of the film in the form of a viscous aqueous solution. However, upon evaporation of the water content of this solution from the surface of the coated film, the coating of methyl cellulose tends to contract or shrink quite markedly with the result that the dried coated film tends to curl tightly about the coated surface of the film. This problem is greatly aggravated when the terephthalate film is in the form of a tape, in which event the dried coated film tends to curl tightly about the longitudinal axis of the tape.

To overcome these and other difficulties encountered in applying an adherent coating of methyl cellulose to the polyester terephthalate film, and to insure a uniform and continuous coating on the film, I have devised a novel method of preparing the coated parting film of my invention. The method of my invention comprises applying a viscous aqueous solution of methyl cellulose in a continuous layer of predetermined thickness to one surface of the film of polyester terephthalate material, and applying heat to the coated film to evaporate the water content of the layer of methyl cellulose while maintaining the film laterally flat. Tapes or films coated in this manner remain laterally flat after drying and have proved eminently satisfactory as a parting material in the manufacture of glass fiber reinforced plastic pipe with the result that the cured pipe can be readily stripped from the pipe-forming mandrel and the parting layer of coated tape can be readily removed from within the finished pipe.

In the practice of my invention, described hereinafter in conjunction with the accompanying drawing, a tape of polyester terephthalate film 10 has applied thereto an adherent layer of methyl cellulose 11. The methyl cellulose is applied to the tape in the form of a viscous aqueous solution in a layer of predetermined thickness by means of an applicator device 12. The film tape 10 with the coating of aqueous methyl cellulose thereon is then passed through a special dryer 13 which evaporates the water from the methyl cellulose coating while maintaining the tape laterally flat, so that when the tape is fully dried there will be no tendency on the part of the tape to curl. The coated tape 10 is thereupon wound up on a take-up reel 14 driven by variable speed motor means 15.

The applicator device 12 I have devised to apply the viscous aqueous solution of methyl cellulose to the surface of the polyester terephthalate film comprises a backing roll 17, an applicator roll 18, and a follow-up roll 19. The backing roll 17 is mounted so that it can be moved toward or away from the applicator roll 18, and is advantageously further provided with spring or other means 20 whereby the force with which the backing roll is urged toward the applicator roll can be regulated. As a consequence, the thickness of the film of methyl cellulose 12 applied to the tape can be closely controlled. The polyester terephthalate tape 10 passes over the backing roll 17, under the applicator roll 18, and over the follow-up roll 19. The viscous aqueous solution of methyl cellulose 10 is applied to the tape at the nip of the backing roll and the applicator roll, and is supplied to the applicator roll from a suitable supply vessel 21 at a rate equal to that at which it is applied to the surface of the tape 10.

The polyester terephthalate tape 10 coated with a layer of methyl cellulose solution 11 is then passed through the dryer 13 to evaporate the water therefrom. The dryer 13, which is specifically designed to maintain the tape laterally flat as the water is evaporated therefrom, comprises entrance and exit guide rollers 23, heating means 24, and a relatively long metal table 25 the central portion of which is slightly upwardly bowed or arched so that the tape 10 will necessarily remain laterally flat as it progresses through the dryer. Advantageously the heating means comprises a number of electric heat lamps 26 arrayed along the path of travel of the tape on the arched table. Because the tape 10 and methyl cellulose coating 11 thereon are substantially transparent, the tape absorbs very little radiant heat energy from the heating means 24. However, the arched table 25 with which the tape is in contact during the drying operation absorbs a great deal of the radiant heat energy of the heat lamps 26, and consequently the table becomes quite hot. Heat energy is then transferred by simple conduction from the heated table to the film or tape being dried. Therefore, not only does the arched table 25 maintain the tape laterally flat while the methyl cellulose layer thereon is being dried, but it also serves as the principal heat transfer medium or means of the dryer.

The tape 10 emerging from the dryer is coated with a uniform continuous layer of firmly adherent dry methyl cellulose. Despite the fact that the methyl cellulose coating tends to contract appreciably as it is dried, due to the method of drying employed the dry tape remains flat and has no tendency to curl inwardly about its longitudinal axis as would ordinarily be the case. The dry coated tape 10 is then wound up on the take-up reel 14 driven by the motor means 15. The speed of the motor is controlled so that the tape 10 will be drawn through the dryer 13 at a rate such that the coating of methyl cellulose is completely dry before leaving the dryer. As hereinbefore described, the resulting coated tape is especially useful as a parting material in manufacturing processes wherein thermosetting plastic materials are applied to a mold or mandrel.

It will be seen from the foregoing discussion of my invention that I have devised a novel method of applying a firmly adherent continuous coating of methyl cellulose to a tape of polyester terephthalate film. The method of my invention makes available for use in plastic molding processes polyester terephthalate film, a material whose exceptional physical characteristics could not be heretofore exploited in such molding operations.

I claim:

1. A tape of polyester terephthalate film, said tape having a continuous coating of dry methyl cellulose adhering directly to one surface thereof, said coated tape being normally flat and having no tendency to curl due to shrink stresses present in the coating of dry methyl cellulose.

2. A tape for separating a mandrel from an overlying layer of thermosetting plastic material, said plastic material being applied about said mandrel and said tape in an uncured state and being subsequently cured thereabout, said tape comprising a strip of polyester terephthalate film having a continuous coating of dry methyl cellulose adhering directly to the surface of the film, said coating of dry methyl cellulose being free of internal shrinkage stresses so that the coated tape is normally laterally flat.

References Cited in the file of this patent
UNITED STATES PATENTS

| | | |
|---|---|---|
| 2,286,569 | Pollack | June 16, 1942 |
| 2,613,397 | Borkland | Oct. 14, 1952 |
| 2,673,826 | Ness | Mar. 30, 1954 |
| 2,693,006 | Shigekawa | Nov. 2, 1954 |
| 2,698,241 | Saner | Dec. 28, 1954 |
| 2,702,251 | Speed | Feb. 15, 1955 |

OTHER REFERENCES

Ellis and Simonds: "Handbook of Plastics," 1943, page 313.